(12) United States Patent
Rudberg et al.

(10) Patent No.: US 9,114,802 B2
(45) Date of Patent: Aug. 25, 2015

(54) DEVICE AND METHOD FOR CONTROLLING BRAKING OF A MOTOR VEHICLE

(71) Applicants: Arvid Rudberg, Västervik (SE); Andreas Laghamn, Södertälje (SE); Anna Wingren, Södertälje (SE); Peter Püschel, Domsjö (SE)

(72) Inventors: Arvid Rudberg, Västervik (SE); Andreas Laghamn, Södertälje (SE); Anna Wingren, Södertälje (SE); Peter Püschel, Domsjö (SE)

(73) Assignee: SCANIA CV AB (SE)

( * ) Notice: Subject to any disclaimer, the term of this patent is extended or adjusted under 35 U.S.C. 154(b) by 0 days.

(21) Appl. No.: 14/355,040

(22) PCT Filed: Oct. 10, 2012

(86) PCT No.: PCT/SE2012/051083
§ 371 (c)(1),
(2) Date: Apr. 29, 2014

(87) PCT Pub. No.: WO2013/066242
PCT Pub. Date: May 10, 2013

(65) Prior Publication Data
US 2014/0316669 A1    Oct. 23, 2014

(30) Foreign Application Priority Data
Oct. 31, 2011   (SE) ...................... 1151015

(51) Int. Cl.
*B60W 10/196*   (2012.01)
*B60T 13/58*    (2006.01)
(Continued)

(52) U.S. Cl.
CPC ............ *B60W 10/196* (2013.01); *B60T 8/1708* (2013.01); *B60T 13/586* (2013.01);
(Continued)

(58) Field of Classification Search
CPC .. B60T 13/586; B60T 8/1708; B60W 10/196; B60W 10/198; B60W 10/184; B60W 10/20; B60W 39/18109; B60W 2520/10
USPC ......... 701/70; 340/903; 342/455; 303/3, 112, 303/113.1
See application file for complete search history.

(56) References Cited

U.S. PATENT DOCUMENTS 5,762,582 A    6/1998   Friedrich et al. ............... 477/208
7,249,810 B2   7/2007   Grupp et al. ................... 303/125
(Continued)

FOREIGN PATENT DOCUMENTS

WO    WO 02/070313         9/2002
WO    WO 2007/139489 A1   12/2007

OTHER PUBLICATIONS

International Search Report mailed Feb. 19, 2013 in corresponding PCT International Application No. PCT/SE2012/051083.

*Primary Examiner* — Marthe Marc-Coleman
(74) *Attorney, Agent, or Firm* — Ostrolenk Faber LLP

(57) ABSTRACT

A method for control of braking by a supplementary brake (290-296) of a motor vehicle (100; 110): Choose (s410) supplementary braking by a control device (270). Continuously determine 20) total available supplementary brake torque (Mtot) and determine (s430) by the control device (270) a chosen proportion (Mshare) of total available supplementary brake torque (Mtot). Determine (s440) a supplementary brake torque (Mtot*) corresponding to the chosen proportion share) and apportion (s450) supplementary brake torque determined (Mtot*) to a chosen supplementary brake (290-296). A computer program (P) implements the method. A device controls braking by a supplementary brake (290-296). A motor vehicle (100; 110) is equipped with the device.

18 Claims, 4 Drawing Sheets

(51) Int. Cl.
*B60W 10/198* (2012.01)
*B60T 8/17* (2006.01)
*B60W 10/184* (2012.01)
*B60W 10/30* (2006.01)
*B60W 30/18* (2012.01)

(52) U.S. Cl.
CPC ........... *B60W10/184* (2013.01); *B60W 10/198* (2013.01); *B60W 10/30* (2013.01); *B60W 30/18109* (2013.01); *B60W 2520/10* (2013.01)

(56) References Cited

U.S. PATENT DOCUMENTS

| | | | |
|---|---|---|---|
| 7,434,893 B2 * | 10/2008 | Sabelstrom et al. | 303/3 |
| 2002/0091479 A1 * | 7/2002 | Maruko et al. | 701/96 |
| 2004/0012251 A1 * | 1/2004 | O'Dea et al. | 303/113.1 |
| 2005/0010335 A1 | 1/2005 | Kettenacker et al. | 701/1 |
| 2005/0052075 A1 | 3/2005 | Sabelstrom et al. | 303/3 |

* cited by examiner

DEVICE AND METHOD FOR CONTROLLING BRAKING OF A MOTOR VEHICLE

CROSS-REFERENCE TO RELATED APPLICATIONS

The present application is a 35 U.S.C. §§371 national phase conversion of PCT/SE2012/051083, filed Oct. 10, 2012, which claims priority of Swedish Application No. 1151015-3, filed Oct. 31, 2011, the contents of which are incorporated by reference herein. The PCT International Application was published in the English language.

TECHNICAL FIELD

The present invention relates to a method for control of braking by means of at least one supplementary brake of a motor vehicle.

The invention relates also to a computer program product comprising program code for a computer for implementing a method according to the invention.

The invention relates also to a device for control of braking by means of at least one supplementary brake of a motor vehicle and to a motor vehicle equipped with the device.

BACKGROUND

In today's vehicles various supplementary brakes are used to reinforce or supplement braking action. One example of a supplementary brake is a so-called retarder associated with the vehicle's transmission. Another example is an exhaust brake arranged to increase the engine's exhaust backpressure and thereby increase the load upon the engine.

Said retarder may be controlled by means of a retarder control lever situated in a driving cab of the vehicle, enabling a driver to set a desired braking action in a number of discrete steps. In one version a driver may choose between five different steps for effecting a certain braking action. In the first four steps different amounts of braking action are applied by means of the retarder. In the fifth step the retarder's maximum possible braking action is applied in conjunction with appropriate braking action of the exhaust brake. Drivers may experience problems because of braking action differing greatly between the fourth (highest but one) step and the fifth (highest) step, since it is so markedly different between them. This is particularly so at relatively low vehicle speeds at which the retarder cannot achieve a particularly large braking torque.

There is a need to improve braking of vehicles whereby supplementary brakes are used to reinforce or supplement the wheel brakes.

There is a need to provide a method for control of braking by means of at least one supplementary brake of a motor vehicle whereby the above disadvantages are reduced.

SUMMARY OF THE INVENTION

One object of the present invention is to propose a novel and advantageous method for control of braking by means of at least one supplementary brake of a motor vehicle.

Another object of the invention is to propose a novel and advantageous device and a novel and advantageous computer program for control of braking by means of at least one supplementary brake of a motor vehicle.

A further object of the invention is to propose a method, a device and a computer program for achieving an alternative control of braking by means of at least one supplementary brake of a motor vehicle.

A further object of the invention is to propose a method, a device and a computer program for achieving uniform braking of a motor vehicle, particularly at low speeds.

A further object of the invention is to propose a method, a device and a computer program for achieving improved performance of a motor vehicle.

These objects are achieved with a method for control of braking by means of at least one supplementary brake of a motor vehicle, according to the invention.

One aspect of the invention is a proposed method for control of braking by means of at least one supplementary brake of a motor vehicle, comprising the steps of choosing supplementary braking action by means of a control device, continuously determining a total available supplementary brake torque, determining by means of said control device a chosen proportion of said total available supplementary brake torque, determining a supplementary brake torque corresponding to said chosen proportion, and using a prevailing vehicle speed as a basis for apportioning said supplementary brake torque determined to at least one chosen supplementary brake in order to achieve the chosen supplementary braking action.

More uniform braking of the vehicle is thus achieved in that braking action by means of supplementary brakes is with advantage more evenly apportioned than in today's vehicles. Implementing the invention for example means that a step of braking action between a highest-but-one desired discrete level and a highest discrete level is smaller than in vehicles with prior art as above. The method comprises also the step of apportioning supplementary brake torque on the basis of a prevailing vehicle speed. The result is a robust method according to one aspect of the present invention. A prevailing speed of the vehicle can with relatively high reliability be continuously determined in known ways. A precise method for control of braking by means of at least one supplementary brake of a motor vehicle is thus also achieved.

The method may further comprise the step of choosing supplementary braking action in discrete steps, resulting in a user-friendly method according to one aspect of the present invention. In many vehicles today there is already a retarder control lever used to control the vehicle's braking action. Drivers of these vehicles are thus already accustomed to using said lever to control braking and may therefore find it easy to use it for braking the vehicle in a similar way, even where the innovative method is implemented in control algorithms of a control unit of the vehicle.

The method may further comprise the step of choosing supplementary braking action steplessly, making it possible with advantage for the setting of desired braking action to be effected with greater precision than when using discrete steps as above.

In one version, stepless setting of a desired braking torque may be configured according to a linear relationship. In an alternative version, said stepless setting of a desired braking torque may be configured according to a relationship defined by any suitable function, e.g. an exponential function whereby a level of desired braking torque increases with an increased level of the stepless setting.

The method may further comprise the step of altering said apportionment during a braking process, resulting in a versatile method for control of braking by means of at least one supplementary brake of a motor vehicle. By continuously altering the apportionment of braking torque between available supplementary brakes it is possible to achieve optimised braking action of the supplementary brakes. Certain supplementary brakes may be more effective at relatively high vehicle speeds, whereas others may be more effective at relatively low speeds. The apportionment of braking torque may be effected continuously on the basis of one or more suitable parameters, e.g. a time derivative with respect to vehicle speed, exhaust temperature, coolant temperature and battery charge level.

The method may further comprise the step of discontinuing supplementary braking action by adopting a neutral position of said control device, resulting in a cost-effective and user-friendly method according to one aspect of the present invention. The fact that a retarder control lever already provided saves a driver from having to use any further control device to discontinue supplementary braking action is also likely to reduce the load upon him/her in stressful situations.

Said control device may be a retarder control lever, resulting in a user-friendly method according to the invention. The fact that a retarder control lever already provided saves a driver from having to use any further control device to achieve desired braking action by means of the vehicle's supplementary brakes is also likely to reduce the load upon him/her in stressful situations.

Said at least one supplementary brake may be chosen from among a category which comprises retarder, exhaust brake, engine fan, liquid pump, air compressor, countershaft brake and electrical machine, resulting in a versatile method for control of braking by means of at least one supplementary brake of a motor vehicle and making it possible to achieve improved apportionment of available braking torque.

The method is easy to implement in existing motor vehicles. Software for control of braking by means of at least one supplementary brake of a motor vehicle may be installed in a control unit of the vehicle during the manufacture of the vehicle. A purchaser of the vehicle may thus have the possibility of selecting the function of the method as an option. Alternatively, software which comprises program code for applying the innovative method may be installed in a control unit of the vehicle on the occasion of upgrading at a service station, in which case the software may be loaded into a memory in the control unit. Implementing the innovative method is therefore cost-effective, particularly as no further sensors or other components need be installed in the vehicle according to one aspect of the invention. Relevant hardware is currently already provided on board the vehicle. The invention therefore represents a cost-effective solution to the problems indicated above.

Software comprising program code for control of braking by means of at least one supplementary brake of a motor vehicle is easy to update or replace. Different parts of the software comprising program code for applying the innovative method may also be replaced independently of one another. This modular configuration is advantageous from a maintenance perspective.

One aspect of the invention proposes a device for control of braking by means of at least one supplementary brake of a motor vehicle, comprising
  means for choosing supplementary braking action,
  means for continuously determining a total available supplementary brake torque,
  means for determining by means of said control device a chosen proportion of said total available supplementary brake torque,
  means for determining a supplementary brake torque corresponding to said chosen proportion, and
  means for using a prevailing vehicle speed as a basis for apportioning said supplementary brake torque determined to at least one chosen supplementary brake in order to achieve the chosen supplementary braking action.

The result is coordinated modulation of the vehicle's supplementary brake torque, enabling uniform and continuous braking of the vehicle at all speeds of its universal shaft. It also makes it possible for supplementary brake torque to be imparted at any time from the most appropriate supplementary brake or brakes. This is particularly advantageous at relatively low speeds of the vehicle in providing the driver with greater potential for proportioning an acting braking torque to desirable levels through said means for choosing supplementary braking action. Downward gearchanges in the vehicle's gearbox may still be effected to the extent required for maintaining the braking torque desired by the driver without the engine being speeded up more than necessary. The device comprises also means for apportioning supplementary brake torque on the basis of a prevailing vehicle speed. It may in certain situations be more advantageous to apportion a larger braking torque to a retarder at high speeds of the vehicle, e.g. at above 50 km/h. It may in certain situations be more advantageous to apportion a larger braking torque to an exhaust brake at lower speeds of the vehicle, e.g. at below 50 km/h or 20 km/h.

In other words, one aspect of the invention proposes coordinated control of the vehicle's supplementary brakes, e.g. by means of a single lever in the driving cab. An already present supplementary brake control lever, e.g. a retarder control lever, may preferably be used for this purpose. Modulating the braking torque involves the aggregate available supplementary brake torque from all of the vehicle's available supplementary brakes and a chosen proportion of the total supplementary brake torque being apportioned to appropriate supplementary brakes by order of priority or weighting. A supplementary brake may be defined as a braking mechanism of the vehicle other than existing service brakes (wheel brakes).

Said means for choosing supplementary braking action may be any suitable control device. It may be a retarder control lever. The result is a cost-effective solution to the problems indicated above. Using an already present supplementary brake control lever for this purpose means that no further components need be installed in the vehicle.

Said means for choosing supplementary braking action may be any suitable selector configuration. It may comprise a touchscreen or an interactive viewing screen.

Said means for choosing supplementary braking action may be arranged to do so in discrete steps. It may be arranged to choose supplementary braking action in any suitable number of discrete steps. It may be arranged to do so in five discrete steps. It may for example be arranged to choose supplementary braking action in 2-10 discrete steps. It may be arranged to do so in 3-7 discrete steps. It may for example be arranged to do so in 4-6 discrete steps.

In an alternative version, said means for choosing supplementary braking action may be arranged to do so steplessly.

In one version, the device may further comprise means for altering said apportionment during a braking process, making it possible to achieve an optimised braking method.

Said means for choosing supplementary braking action may have a neutral position at which no supplementary braking action is applied by the vehicle's supplementary brakes. The innovative device may thus further comprise means for discontinuing supplementary braking action by adopting a neutral position of said means.

Said at least one supplementary brake may be chosen from among a category which comprises retarder, exhaust brake, engine fan, liquid pump, air compressor, countershaft brake and electrical machine. It should be noted that said at least one supplementary brake may be any suitable supplementary brake which can contribute to increasing a braking torque of a transmission of the vehicle.

A gear ratio of a gearbox of the vehicle may also be used to control braking action of at least one supplementary brake situated upstream of the gearbox in the vehicle's power train, e.g. the exhaust brake and/or a drag torque of the vehicle's engine.

A gear ratio of a transfer gearbox of the vehicle may also be used to control braking action of at least one supplementary brake situated upstream of the treansfer gearbox in the vehicle's power train, e.g. the retarder, the exhaust brake and/or a drag torque of the vehicle's engine.

The above objects are also achieved with a motor vehicle which is provided with the device. The vehicle may be a truck, bus or car.

The motor vehicle may be a wheeled loader, a forestry machine or a vehicle suited to operating in a mine or quarry.

One aspect of the invention is a proposed computer program for control of braking by means of at least one supplementary brake of a motor vehicle, which program comprises program code stored on a computer-readable medium for causing an electronic control unit or another computer connected to the electronic control unit to perform steps according to the invention.

One aspect of the invention is a proposed computer program product comprising a program code stored on a computer-readable medium for performing method steps according to the invention when said computer program is run on an electronic control unit or another computer connected to the electronic control unit.

Further objects, advantages and novel features of the present invention will become apparent to one skilled in the art from the following details, and also by putting the invention into practice. Whereas the invention is described below, it should be noted that it is not confined to the specific details described. One skilled in the art having access to the teachings herein will recognise further applications, modifications and incorporations within other fields, which are within the scope of the invention.

BRIEF DESCRIPTION OF THE DRAWINGS

For fuller understanding of the present invention and its further objects and advantages, the detailed description set out below should be read in conjunction with the accompanying drawings, in which the same reference notations pertain to similar items in the various diagrams and FIG. 1 schematically illustrates a vehicle according to an embodiment of the invention, FIG. 2 schematically illustrates a subsystem for the vehicle depicted in FIG. 1, according to an embodiment of the invention.

DETAILED DESCRIPTION OF EMBODIMENTS

Figure 1:
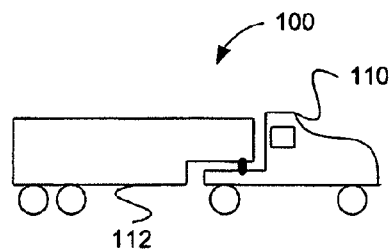

FIG. 1 depicts a side view of a vehicle 100. The vehicle here exemplified comprises a tractor unit 110 and a semitrailer 112. It may be a heavy vehicle, e.g. a truck or a bus. It may alternatively be a car.

The term "link" refers herein to a communication link which may be a physical connection such as an opto-electronic communication line, or a non-physical connection such as a wireless connection, e.g. a radio link or microwave link.

The term "supplementary brake" is herein defined as a braking mechanism other than the vehicle's wheel brakes (service brakes). It may be a physical unit which is situated in the vehicle's power train and which can in a controlled way act to reduce a universal-shaft speed (corresponding to a vehicle speed). Said supplementary brakes may in a controlled way cause a braking torque in the vehicle's power train.

The term "supplementary brake torque" is herein defined as a torque which gives rise to a braking force between the vehicle's wheels and a surface on which the vehicle is running at the time. It may for example act upon the output shaft of the retarder 296.

In one example a braking action of a friction torque of the engine may be controlled indirectly by active gear choice in the vehicle's transmission.

A supplementary brake may be any suitable regulatable ancillary capable of providing a braking torque in the vehicle's power train. The present invention is therefore not restricted to the supplementary brake examples herein indicated but comprises suitable directly or indirectly controllable ancillaries with the aforesaid functionality.

Figure 2:
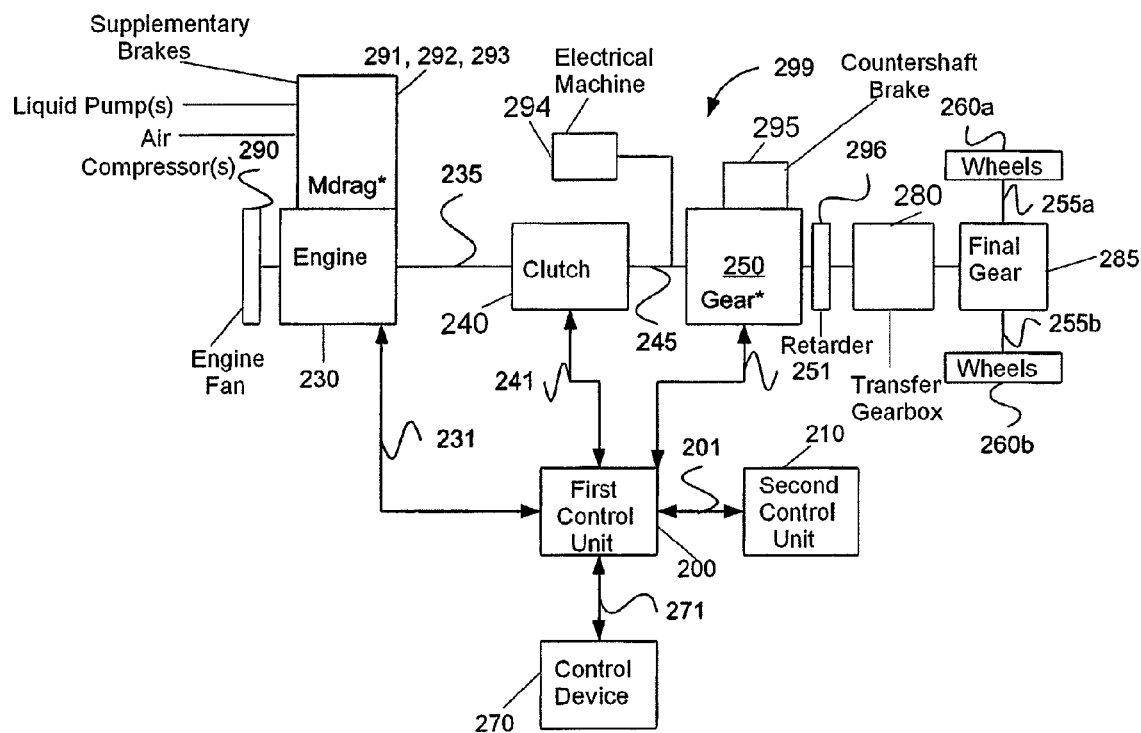

FIG. 2 depicts a subsystem 299 of the vehicle 100. This subsystem is situated in the tractor unit 110. The tractor unit may be equipped with a two-pedal system for operating the vehicle. The vehicle may be equipped with an automated gearbox or a manual gearbox. The subsystem 299 comprises a combustion engine 230 which may be a diesel engine.

The engine 230 has an output shaft 235 connected to a clutch 240 which may be a suitable automatic clutch of friction type, e.g. comprising two discs.

A clutch actuator (not depicted) is provided to act upon the clutch 240 in such a way that a desirable torque is transferred through the clutch in the power train to propel said vehicle. The clutch actuator is adapted to causing the clutch to be fully open, partly closed (clutch slipping) or fully closed.

The clutch 240 has an output shaft 245 connected to a gearbox 250. The gearbox has an output shaft connected to a transfer gearbox 280. The transfer gearbox has an output shaft connected to a final gear 285. The final gear is connected to two tractive wheels 260a and 260b via respective driveshafts 255a and 255b. Torque generated by the engine 230 may be transmitted via the shaft 235, the clutch 240, the shaft 245, the gearbox 250, the transfer gearbox 280 and the final gear 285 to the tractive wheels 260a and 260b. In an alternative version, the vehicle has no transfer gearbox 280.

It should also be noted that the vehicle 100 may be equipped with a number of pairs of tractive wheels and not necessarily only one pair as in the example depicted in FIG. 2. The vehicle may thus for example be equipped with two or three pairs of tractive wheels.

A first control unit 200 is arranged for communication with the engine 230 via a link 231. This first control unit is arranged for communication with the clutch 240 via a link 241, enabling it to apply a degree of closure to the clutch 240 by means of said clutch actuator. The first control unit is arranged for communication with the gearbox 250 via a link 251. It is adapted to controlling the operation of the engine 230. It is adapted to controlling the operation of the clutch 240 by applying a degree of closure of the clutch actuator in a desirable way. It is adapted to controlling the operation of the gearbox 250, e.g. by applying a gear ratio of the gearbox. It is adapted to controlling the operation of the transfer gearbox 280, e.g. by applying a gear ratio of the transfer gearbox. It is signal-connected for this purpose to the transfer gearbox via a link (not depicted).

The subsystem 299 comprises a number of supplementary brakes. It should be noted that the first control unit 200 is adapted to controlling all of the supplementary brakes directly or indirectly (e.g. by means of a chosen gear ratio in the gearbox 250). It is thus adapted to continuously controlling the braking torque which each of the supplementary brakes is to apply in the vehicle's power train. For the sake of clarity, communication links between the first control unit and the respective supplementary brakes have been omitted in FIG. 2.

The subsystem 299 comprises a conventional engine fan 290 adapted to being driven in a controlled way by torque provided by the engine 230.

The subsystem 299 comprises one or more liquid pumps 291 adapted to being driven in a controlled way by torque provided by the engine 230.

The subsystem 299 comprises one or more air compressors 292 adapted to being driven in a controlled way by torque provided by the engine 230.

The subsystem 299 comprises an exhaust brake configuration 293 associated with the engine 230 in a conventional way and adapted to providing braking torque for the engine 230 in a controlled way.

A gear of the vehicle's gearbox 250 (and/or the transfer gearbox 280) may be used to indirectly control braking action of at least one supplementary brake situated upstream of the gearbox (or the transfer gearbox) in the vehicle's power train.

In one embodiment, the subsystem 299 comprises an electrical machine 294. In this case the vehicle may be a so-called hybrid vehicle. Said electrical machine is associated with the shaft 245 in a conventional way and is adapted to being able to impart braking torque to the vehicle's power train in a controlled way, subject to certain conditions.

The subsystem 299 comprises a countershaft brake 295 associated with the gearbox 250 in a conventional way and adapted to being able to impart braking torque to the vehicle's power train in a controlled way.

The subsystem 299 comprises a retarder 296 associated with the gearbox output shaft in a conventional way and adapted to being able to impart braking torque to the vehicle's power train in a controlled way.

The first control unit 200 is adapted to continuously determining a total available supplementary brake torque which is the aggregate of the respective available braking torques of the supplementary brakes 293.

The first control unit 200 is adapted to continuously determining a prevailing maximum braking torque of the engine fan 290. It is adapted to continuously determining a prevailing maximum braking torque of the at least one liquid pump 291. It is adapted to continuously determining a prevailing maximum braking torque of the at least one air compressor 292. It is adapted to continuously determining a prevailing maximum braking torque of the electrical machine 294. It is adapted to continuously determining a prevailing maximum braking torque of the countershaft brake 295. It is adapted to continuously determining a prevailing maximum braking torque of the retarder 296. It is adapted to continuously summing the maximum available braking torques of the respective available supplementary brakes 290-296. The aggregate of the prevailing total available braking torques of the respective supplementary brakes is herein called the total available braking torque Mtot.

The first control unit 200 is adapted to determining by means of said control device a chosen proportion of said total available supplementary brake torque. It is adapted to determining a supplementary brake torque corresponding to said chosen proportion. It is adapted to apportioning said supplementary brake torque determined to at least one chosen supplementary brake in order to achieve the chosen supplementary braking action. It is adapted to altering said apportionment during a braking process. It is adapted to apportioning supplementary brake torque on the basis of a prevailing vehicle speed. It is adapted to discontinuing supplementary braking action by adopting a neutral position of said control device.

The subsystem 299 comprises a control device 270 which is signal-connected to the first control unit 200 by a link 271. The control device may be a retarder control lever and may be arranged to choose supplementary braking action in discrete steps, enabling the driver to use it to set desired braking action manually.

In one example the control device 270 may have a neutral position N corresponding to a state in which no supplementary brake torque is apportioned to the various supplementary brakes. In one example the control device has five discrete positions 1-5 corresponding respectively to desired braking action representing 20, 40, 60, 80 and 100% of total available supplementary brake torque.

In an example where the driver puts the control device 270 into position 2 corresponding to a desired braking action representing 40% of total available supplementary brake torque, the first control unit will determine a braking torque Mtot* (0.4*Mtot) to be apportioned to at least one of the vehicle's supplementary brakes.

Similarly, in an example where the driver puts the control device 270 into position 5 corresponding to a desired braking action representing 100% of total available supplementary brake torque, the first control unit will determine a braking torque Mtot* (1.00*Mtot) to be apportioned to at least one of the vehicle's supplementary brakes.

In another example, the control device 270 has three discrete positions 1-3 corresponding respectively to desired braking action representing 33, 66 and 100% of total available supplementary brake torque.

The control device 270 may alternatively be arranged to choose supplementary braking action steplessly, enabling a driver to use it to set desired braking action manually, whereby a supplementary brake torque Mtot* which is to be apportioned is determined in a way similar to that described above.

In one version the control device 270 may be a touchscreen signal-connected to the first control unit 200 and usable by a driver to set desired braking action. Supplementary braking action may here be chosen in discrete steps or steplessly in a similar way to that described above. It should be noted that said control device may be any suitable control device for setting desired braking action.

A second control unit 210 is arranged for communication with the first control unit 200 via a link 201. It may be detachably connected to the first control unit. It may be a control unit external to the vehicle 100. It may be adapted to effecting the innovative method steps according to the invention. It may be used to cross-load software to the first control unit 200, particularly software for applying the innovative method. It may alternatively be adapted to communicate with the first control unit via an internal network on board the vehicle. It may for example be adapted to performing substantially similar functions to the first control unit, e.g. continuously determining a total available supplementary brake torque of the vehicle and determining by means of the control device a chosen proportion of said total available supplementary brake torque. It may be adapted to determining supplementary brake torque corresponding to said chosen proportion and to apportioning said supplementary brake torque determined to at least one chosen supplementary brake in order to achieve the chosen supplementary braking action.

The subsystem 299 comprises a two-pedal system (not depicted) comprising a conventional acceleration control, e.g. an accelerator pedal, and a brake pedal. The acceleration control is signal-connected to the first control unit 200. The driver can use the acceleration control to demand desired torque from the engine 230. The driver can use it to control the vehicle's propulsion on the basis of driving torque demanded by him/her by mobilisation of power. The brake pedal is signal-connected to the first control unit 200 and may be arranged to brake the vehicle by means of the wheel brakes.

Figure 3A:
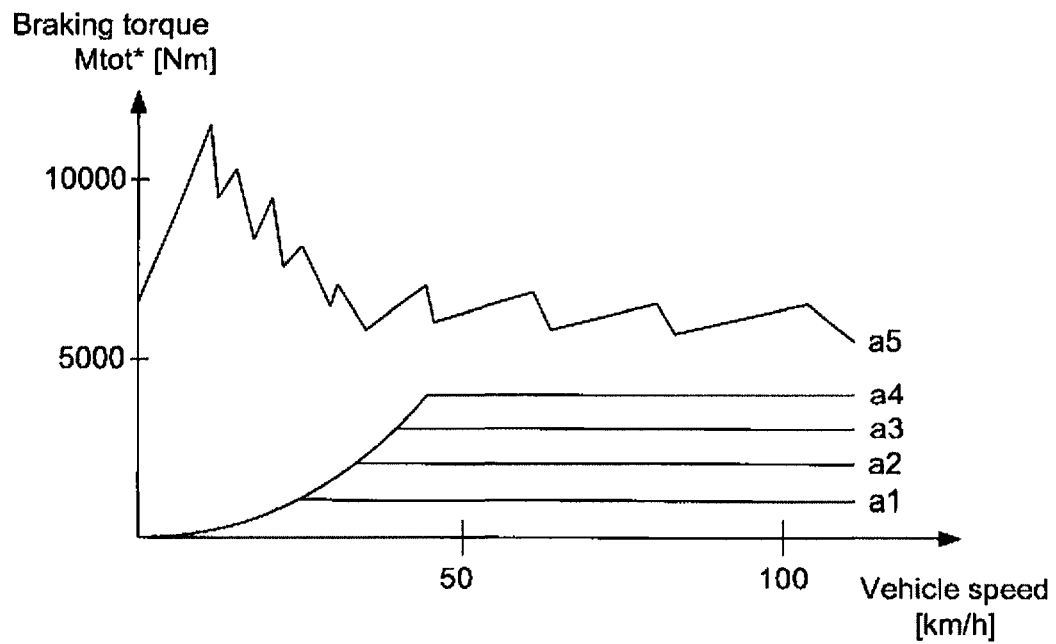
FIG. 3a is a schematic diagram showing apportioned braking torque as a function of vehicle speed in prior art.

FIG. 3*a* is a schematic diagram showing apportioned braking torque as a function of vehicle speed in prior art.

It illustrates a supplementary brake torque Mtot* which may be apportioned to various supplementary brakes of the vehicle 100. In this embodiment the control device 270 has five different discrete positions as well as a neutral position N. In the first four positions called a1, a2, a3 and a4, only the retarder 296 is used in supplementary braking.

At a fifth position a5 the exhaust brake is also activated. It should be noted that the braking torque differs greatly between said fourth step and said fifth step, particularly at low vehicle speeds.

Figure 3B:
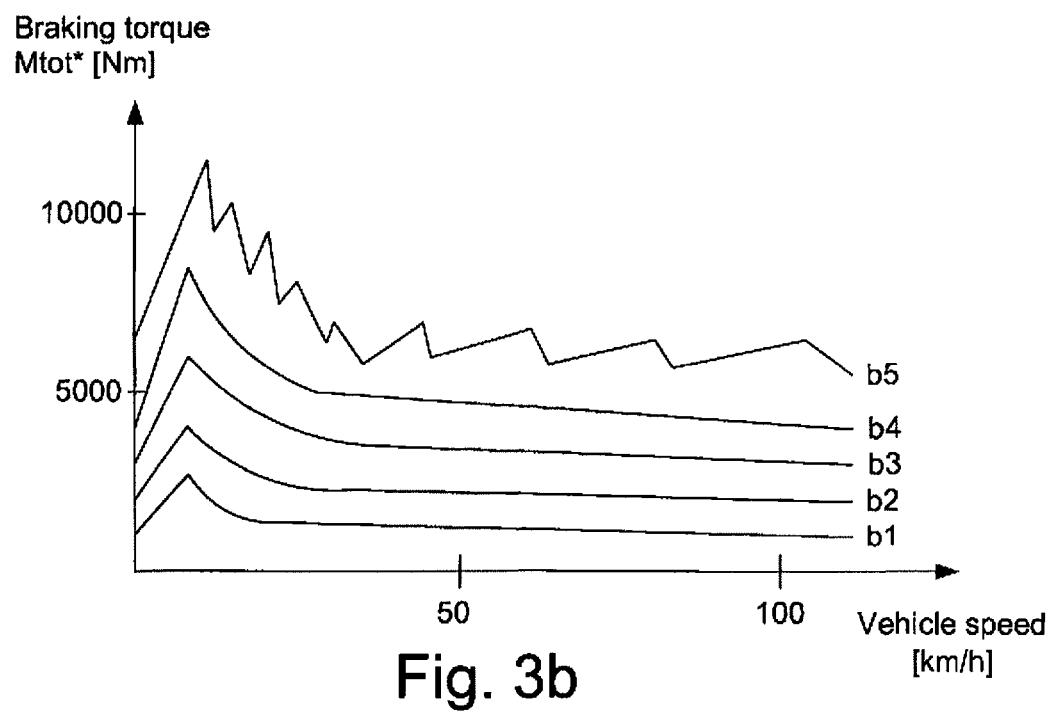
FIG. 3b is a schematic diagram showing apportioned braking torque as a function of vehicle speed according to an aspect of the invention.

FIG. 3*b* is a schematic diagram showing apportioned braking torque as a function of vehicle speed according to an aspect of the invention.

It illustrates a supplementary brake torque Mtot* which may be apportioned to various supplementary brakes of the vehicle 100. In this embodiment the control device 270 has five different discrete positions as well as a neutral position N. In the first four positions called b1, b2, b3 and b4 suitable supplementary brakes according to the invention are used.

It should be noted that the braking torque is with advantage more equally apportioned among the various steps b1-b5, particularly at low vehicle speeds.

Important advantages of the present invention are thus schematically illustrated.

Figure 4A:
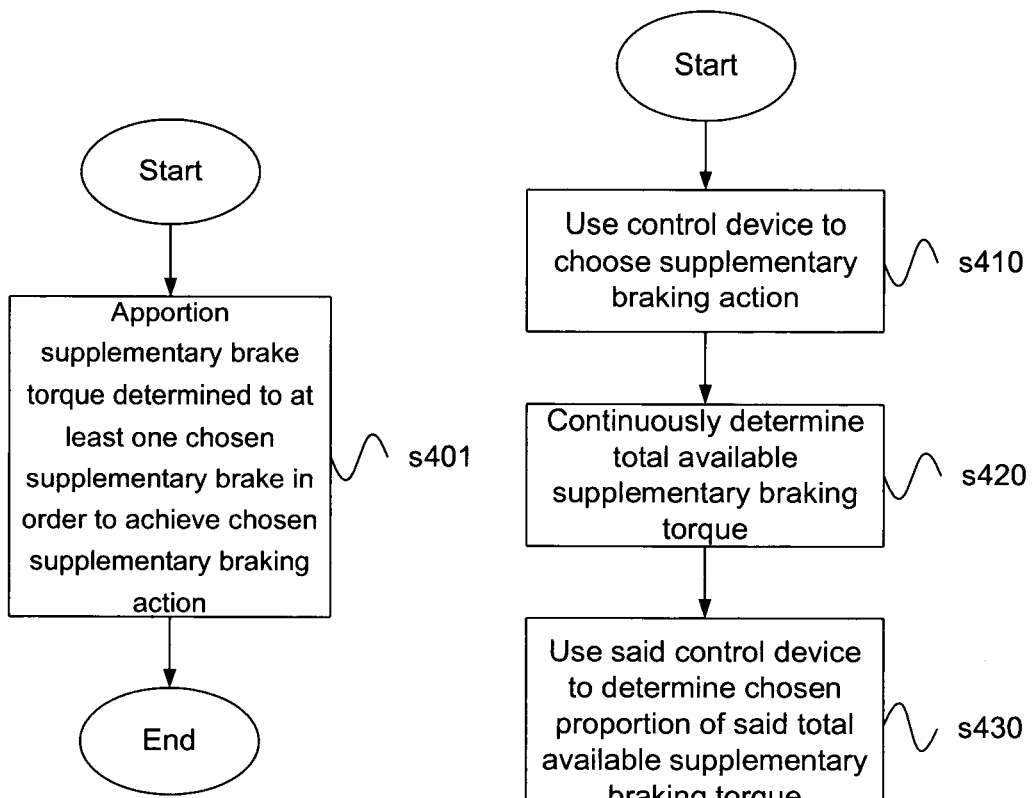
FIG. 4a is a schematic flowchart of a method according to an embodiment of the invention.

FIG. 4*a* is a schematic flowchart of a method for control of braking by means of at least one supplementary brake of a motor vehicle, according to one embodiment of the invention. The method comprises a first step s401 comprising the steps of choosing supplementary braking action by means of a control device, continuously determining a total available supplementary brake torque, determining by means of said control device a chosen proportion of said total available supplementary brake torque, determining a supplementary brake torque corresponding to said chosen proportion, and apportioning said supplementary brake torque determined to at least one chosen supplementary brake in order to achieve the chosen supplementary braking action. The method ends after step s401.

Figure 4B:
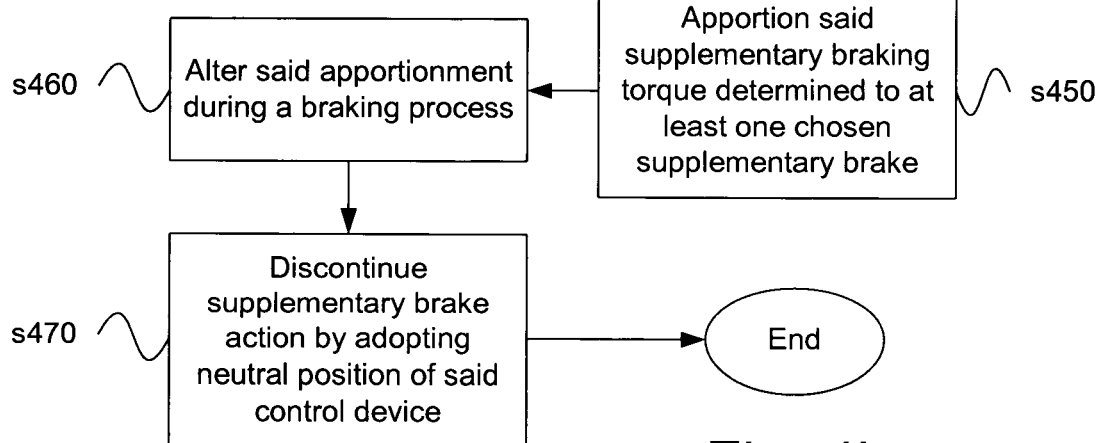
FIG. 4b is a more detailed schematic flowchart of a method according to an embodiment of the invention, and FIG. 5 schematically illustrates a computer according to an embodiment of the invention.

FIG. 4*b* is a more detailed schematic flowchart of a method for control of braking by means of at least one supplementary brake of a motor vehicle, according to one embodiment of the invention.

The method comprises a step s410 comprising the step of choosing supplementary braking action by means of the control device 270, which may be effected manually by a driver of the vehicle 100. Desired supplementary braking action may be chosen steplessly or in a discrete step. Step s410 is followed by a step s420.

Method step s420 comprises the step of continuously determining a total available supplementary brake torque Mtot, which may be done in any suitable way. In one version, Mtot is calculated according to routines stored in the first control unit 200 or the second control unit 210. In a preferred version it is calculated continuously according to routines stored in the first control unit or the second control unit. Information is thus provided continuously about a prevailing maximum available supplementary brake torque Mtot of the vehicle. Step s420 is followed by a step s430.

Method step s430 comprises the step of using said control device to determine a chosen proportion Mshare of said total available supplementary brake torque. Mshare may be determined on the basis of a set position of the control device 270 in cases where the latter is a lever or operating device, e.g. an existing retarder control lever of the vehicle 100. It may be determined on the basis of a setting made by means of the control device 270 in cases where the latter is for example a touchscreen. It may be a whole number expressed as a percentage (%) or a decimal number expressed as a percentage (%) with desired precision. It may be a number within a range [0,1]. It may be expressed in the form of a percentage, e.g. 20%, 50%, 72% or 88.6%.

A specific proportion thus corresponds to each discrete position of the control device 270. Similarly, a specific proportion of the total available supplementary brake torque Mtot corresponds to each unique position or setting of the control device. Step s430 is followed by a step s440.

Method step s440 comprises the step of determining a supplementary brake torque Mtot* corresponding to said chosen proportion Mshare of the available supplementary brake torque Mtot. This may be calculated according to stored routines in the first control unit 200 or the second control unit 210.

In one example the maximum available supplementary brake torque Mtot is multiplied by the chosen proportion Mshare.

Step s440 is followed by a step s450.

Method step s450 comprises the step of apportioning said supplementary brake torque Mtot* determined to at least one chosen supplementary brake 290-294 in order to achieve the chosen supplementary braking action. Said apportionment of the supplementary brake torque Mtot* determined may be determined according to routines stored in the first control unit 200 or the second control unit 210. It may for example be chosen on the basis of a prevailing speed of the vehicle 100. Step s450 is followed by a step s460.

Method step s460 comprises the step of altering said apportionment of the braking torque Mtot* during a braking process, which may be done in various appropriate ways according to running routines stored in the first control unit 200. The apportionment of the braking torque Mtot* may be altered in real time. It may be altered during a braking process on the basis of a prevailing speed of the vehicle 100. It may be altered during a braking process on the basis of a magnitude of a momentary speed of the vehicle 100. Step s460 is followed by a step s470.

Method step s470 comprises the step of discontinuing supplementary braking action by adopting a neutral position of said control device 270, which may be done manually by a driver wishing to stop the vehicle's supplementary braking. The method ends after step s470.

Figure 5:
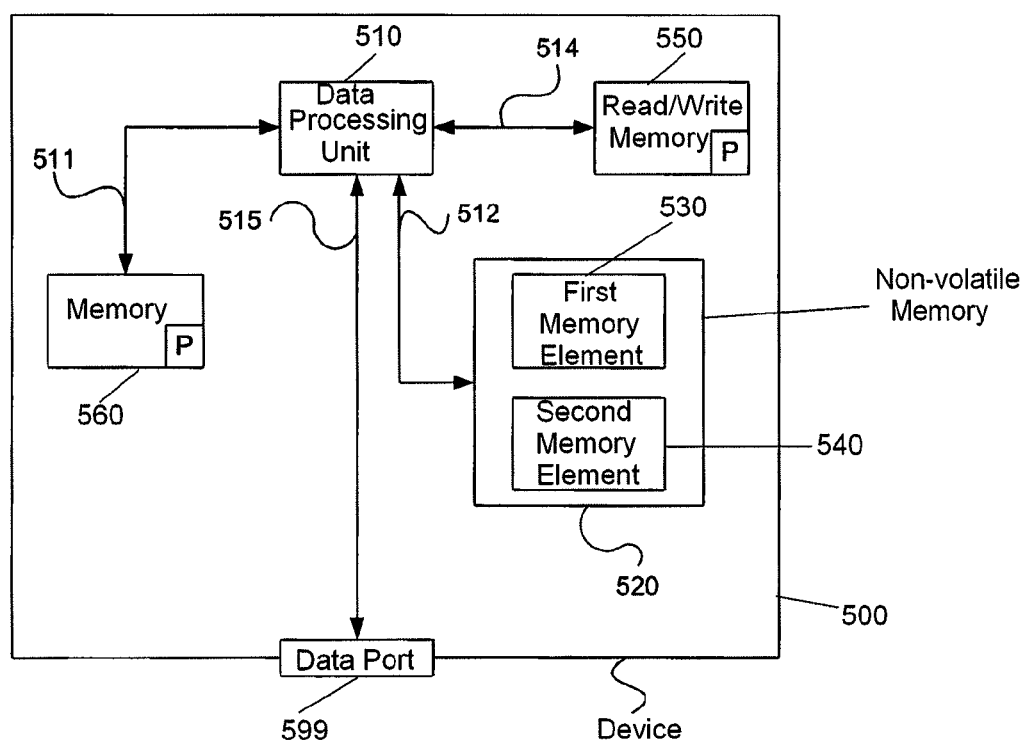

FIG. 5 is a diagram of one version of a device 500. The control units 200 and 210 described with reference to FIG. 2 may in one version comprise the device 500. The device 500 comprises a non-volatile memory 520, a data processing unit 510 and a read/write memory 550. The non-volatile memory 520 has a first memory element 530 in which a computer program, e.g. an operating system, is stored for controlling the function of the device 500. The device 500 further comprises a bus controller, a serial communication port, I/O means, an A/D converter, a time and date input and transfer unit, an event counter and an interruption controller (not depicted). The non-volatile memory 520 has also a second memory element 540.

A proposed computer program P comprises routines for control of braking by means of at least one supplementary brake of a motor vehicle. It comprises routines for receiving a signal which contains information about a supplementary braking action chosen by means of the control device 270. The program comprises routines for continuously determining a total available supplementary brake torque Mtot. It comprises routines for determining the proportion Mshare, chosen by means of said control device, of said total available supplementary brake torque Mtot. It comprises routines for determining a supplementary brake torque Mtot* corresponding to said chosen proportion Mshare. It comprises routines for apportioning said supplementary brake torque Mtot* determined to at least one chosen supplementary brake in order to achieve the chosen supplementary braking action. It comprises routines for altering said apportionment of said supplementary brake torque determined Mtot* during a braking process. It comprises routines for discontinuing supplementary braking action by adopting a neutral position of said control device 270.

The program P may be stored in an executable form or in compressed form in a memory 560 and/or in a read/write memory 550. Where it is stated that the data processing unit 510 performs a certain function, it means that it conducts a certain part of the program which is stored in the memory 560 or a certain part of the program which is stored in the read/write memory 550.

The data processing device 510 can communicate with a data port 599 via a data bus 515. The non-volatile memory 520 is intended for communication with the data processing unit 510 via a data bus 512. The separate memory 560 is intended to communicate with the data processing unit via a data bus 511. The read/write memory 550 is arranged to communicate with the data processing unit via a data bus 514. The links 201, 231, 241, 251 and 271, for example, may be connected to the data port 599 (see FIG. 2).

When data are received on the data port 599, they are stored temporarily in the second memory element 540. The data processing unit 510 will be ready to conduct code execution as described above.

Parts of the methods herein described may be conducted by the device 500 by means of the data processing unit 510 which runs the program stored in the memory 560 or the read/write memory 550. When the device 500 runs the program, methods herein described are executed.

The foregoing description of the preferred embodiments of the present invention is provided for illustrative and descriptive purposes. It is not intended to be exhaustive, nor to limit the invention to the variants described. Many modifications and variations will obviously suggest themselves to one skilled in the art. The embodiments have been chosen and described in order best to explain the principles of the invention and their practical applications and thereby make it possible for one skilled in the art to understand the invention for different embodiments and with the various modifications appropriate to the intended use.

The invention claimed is:

1. A method for control of braking of a motor vehicle by means of a control unit included in the motor vehicle configured to control at least one supplementary brake of the motor vehicle, comprising the steps of:
   a control device choosing a supplementary braking action from more than one braking action;
   continuously determining, by the control unit, a total available supplementary brake torque (Mtot) of said at least one supplementary brake;
   the control unit determining by means of said control device a chosen proportion (Mshare) of said total available supplementary brake torque (Mtot);
   determining, by the control unit, a supplementary brake torque (Mtot*) corresponding to said chosen proportion (Mshare); and
   the control unit using a prevailing vehicle speed as a basis for apportioning said supplementary brake torque (Mtot*) to at least one chosen supplementary brake in order to achieve the chosen supplementary braking action.

2. The method according to claim 1, wherein the control device is configured to permit a choice of supplementary braking action in discrete steps.

3. The method according to claim 1, wherein the control device is configured to permit a choice of supplementary braking action steplessly.

4. The method according to claim 1, further comprising the step of the control unit altering said apportionment during a braking process.

5. The method according to claim 1, further comprising the step of the control unit discontinuing supplementary braking action by adopting a neutral position (N) of said control device.

6. The method according to claim 1, wherein said control device comprises a retarder control lever.

7. The method according to claim 1, wherein said at least one supplementary brake is selected from a group consisting of an engine fan, a liquid pump, an air compressor, an exhaust brake, an electrical machine, a countershaft brake and a retarder.

8. A computer program (P) stored on a non-transitory computer readable storage medium for control of braking by at least one supplementary brake of a motor vehicle,
   wherein when said program is executed by a computer or processor, said program causes an electronic control unit or another computer connected to the electronic control unit to execute steps according to claim 1.

9. A computer program product comprising a program code stored on a non-transitory computer-readable medium for performing method steps according to claim 1, when said computer program product is run on an electronic control unit or another computer connected to the electronic control unit.

10. A device for control of braking of a motor vehicle by means of at least one supplementary brake of the vehicle, the device comprising:

a control device configured and operable to permit operation of the control device to choose a supplementary braking action; and a control unit configured and operable for continuously determining a total available supplementary brake torque (Mtot) of said at least one supplementary brake;

wherein:

the control unit is configured and operable for determining, by said control device, which is configured and operable for choosing supplementary braking action, a chosen proportion (Mshare) of said total available supplementary brake torque (Mtot);

the control unit is configured and operable for determining a supplementary brake torque (Mtot*) corresponding to said chosen proportion (Mshare); and the control unit is configured and operable for apportioning said supplementary brake torque to at least one chosen supplementary brake, using a prevailing vehicle speed as a basis for the apportionment, in order to achieve the chosen supplementary braking action.

11. The device according to claim 10, wherein said control device is configured and operable to permit a choice of supplementary braking action in discrete steps.

12. The device according to claim 10, wherein said control device is configured and operable to permit a choice of supplementary braking action steplessly.

13. The device according to claim 10, wherein the control unit is configured and operable to alter said apportionment during a braking process.

14. The device according to claim 10, wherein the control device is configured and operable to discontinue supplementary braking action by adopting a neutral position of said control device for choosing supplementary braking action.

15. The device according to claim 10, wherein the control device comprises a retarder control lever configured and operable for choosing supplementary braking action.

16. The device according to claim 10, wherein said at least one supplementary brake is selected from a group consisting of an engine fan, a liquid pump, an air compressor, an exhaust brake, an electrical machine, a countershaft brake and a retarder of the motor vehicle.

17. A motor vehicle including the device according to claim 10.

18. The motor vehicle according to claim 17, which is selected from the group consisting of a truck, a bus or a car.

* * * * *